Dec. 15, 1931.  H. R. GRAHAM  1,836,321
AUTOMOBILE FRONT SEAT CONSTRUCTION
Filed June 25, 1928
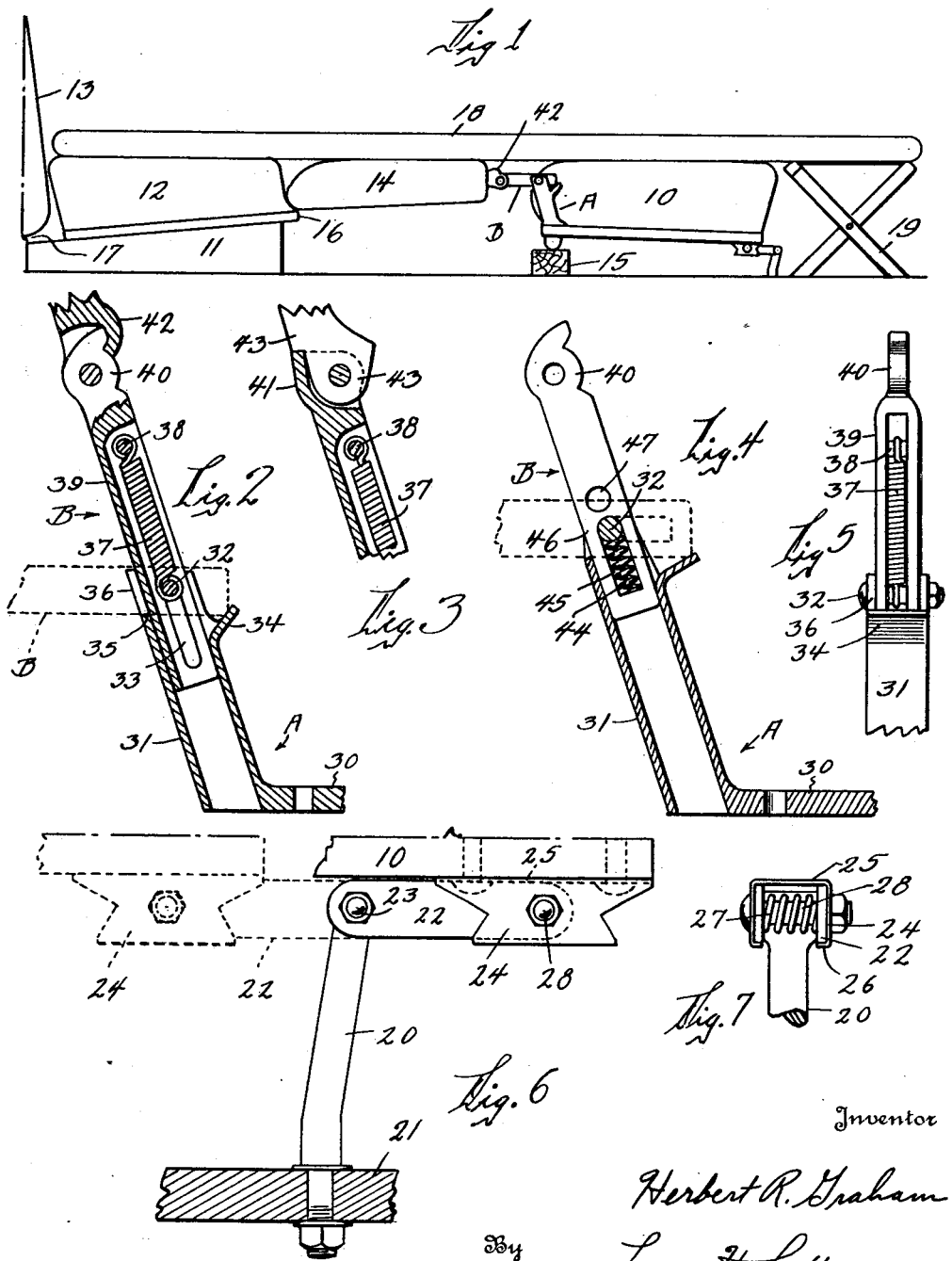
Inventor
Herbert R. Graham
By Lynn H. Latta
Attorney Patented Dec. 15, 1931

1,836,321

UNITED STATES PATENT OFFICE

HERBERT R. GRAHAM, OF MILLER, SOUTH DAKOTA

AUTOMOBILE FRONT SEAT CONSTRUCTION

Application filed June 25, 1928. Serial No. 287,994.

My invention relates to front seat constructions of the type disclosed in my co-pending application, Serial #132,302, filed Aug. 28, 1926, which matured into Patent No. 1,681,979; allowed February 2, 1928, and reissued as Reissue No. 17,755, dated July 29, 1930, and has for its general object to improve upon the construction of that application.

More particularly, it is my object to provide a front seat construction which can be manufactured in the form of an attachment bracket to be substituted for the hinge bracket of the ordinary front seat, the hinge of the seat back remaining unchanged.

Another object is to provide a front seat construction of the general type under consideration, embodying resilient means for holding the seat back in either of its adjusted positions in order that vibration may not affect the position of the hinge.

The above objects are attained generally in a substitute bracket having an auxiliary hinge embodied within the bracket, the bracket thus composing two main elements, a lower bracket proper portion and an upper hinged arm, the upper end of which is formed as a hinge element to coact with the hinge element of the seat back.

A further object is to provide an arrangement embodying such a double hinge and having means for locking the bracket hinge in either of its adjusted positions in order to prevent undesirable collapsing movement of the bracket extension arm, which would otherwise form a loose link between the bracket proper and the seat back.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of the front and rear seats of a vehicle embodying my invention, the parts being arranged to form a complete extended bed.

Fig. 2 is a detailed, sectional view through the preferred form of the bracket embodied in my invention.

Fig. 3 is a fractional view of a somewhat modified form of the same.

Fig. 4 shows a modified form of the bracket.

Fig. 5 is a front elevation of the bracket shown in Fig. 2.

Fig. 6 is a detail view of a front hinge of the front seat cushion and Fig. 7 is an end elevation of said hinge.

In Fig. 1, I have used the reference character 10 to indicate the front seat cushion of a coach type vehicle embodying the rear seat box 11, the rear seat cushion 12, the rear seat back 13 and the front seat back 14.

As in my co-pending application hereinbefore mentioned, the front seat back 14 is designed to be hinged rearwardly to a horizontal position in the same plane with the cushions 10 and 12. The cushion 12 is reversed to bring its upper surface to a substantially level plane and the cushion 10 is elevated by placing a block of wood or the like 15 beneath its rear extremity.

A block of wood may similarly be placed beneath the rear extremity of the seat back 14 after it has been hinged downwardly or the cushion 12 may be provided with a projecting ledge 16 to receive the front seat back. When the cushion 12 is in its normal position reverse to that shown in Fig. 1, the ledge 16 will project within a cavity 17 provided for it between the rear seat back 13 and the seat box 11.

The mattress 18 may then be placed over the aligned cushions 12 and 10 and the front seat back 14 and its forward end supported by a pile of baggage or by a small camp stool 19.

The front hinge of the cushion 10 is constructed as shown in Fig. 6 in order that the cushion may be moved rearwardly to aid in closing the gap between the cushions 12 and 10. This is necessary in some cars, due to the extreme width of the space between the cushions and in other cars it is not necessary.

The normal position of the hinge is shown in full lines in Fig. 6. The usual hinge post 20, secured to the floor 21 in the usual manner is utilized and in place of the hinge element ordinarily secured to the bottom of the cushion 10, I provide a pair of extension arms 22, hinged at 23 to the post 20 and hinged at their other ends between the sides 24 of a bracket 25 secured to the under side of the cushion 10.

The bracket 25 is substantially U shaped in cross section, the lower extremities of the side plates 24 being bent inwardly to form flanges 26, which are parallel to the web of the bracket between the side plates 24. The arms 22 are snugly received between the flanges 26 and the web of the bracket 25 either in the position shown in full lines in Fig. 6 or in a reversed position extending from the other end of the bracket, as shown in dotted lines in Fig. 6. In order to shift the arms from one position to the other, they are pressed together against the action of a spring 27, which is coiled about the hinge pin 28 connecting the arms 22 with the bracket 25. By pressing the arms 22 together, they will clear the flanges 26, allowing the arms and bracket 25 to hinge relative to each other.

When in the position shown in dotted lines in Fig. 6, the hinge serves to support the front seat cushion in a position much farther to the rear than in the position shown in full lines, which is the normal position of the cushion.

The hinge bracket, by means of which the back 14 is made movable rearwardly, comprises a bracket member A, having a foot 30, adapted to be attached to the base of the cushion 10, in the same manner as the usual bracket and a post 31, which extends upwardly at about the same angle as the usual post, but which is shorter than the latter and is made hollow as shown.

The extension arm B of the bracket may be formed in several different ways but in each case, it is pivoted upon a pin 32 and provided with a longitudinal slot 33, allowing its lower end to extend below the bolt into the tubular inclosed portion of the post 31, where it is locked against movement in any direction relative to the post.

The slot 33 allows the extension arm to be drawn upwardly to a position where the lower end of the arm may clear the shoulder formed between the front wall of the post 31 and a lip 34, which projects forwardly and upwardly from the post. The lip is so positioned that when the extension arm B has been moved to the position shown in dotted lines in Figs. 2 and 4, the extension arm will be given a horizontal position when pushed against the lip by the resilient element which will be hereinafter described. In this position, the intermediate portion of the arm will engage a shoulder 35, formed by the termination of the rear wall of the post 31, below the upper end of the post.

The pin 32, upon which the extension arm is hinged, is mounted in the side wings 36, which are thus formed by cutting away the forward and rear walls of the post to form the lip 34 and shoulder 35, respectively.

A resilient element is employed to urge the lower end of the extension arm B away from the pin 32 and in the form of my invention shown in Fig. 2, this resilient element is in the form of a pull spring 37, which is stretched between the pin 32 and a pin 38, mounted in the arm B above the pin 32. The lower end of the arm B is made U shaped in cross section, as at 39, so as to encase the spring 37 and the slots 33 are formed in the side wings of this U shaped or channel shaped member.

The upper end of the arm is formed with the usual hinge element 40 or 41 (Fig. 3) to receive the usual seat back hinge element 42 or 43, respectively, according to the type of hinge which is already found in the vehicle to be installed with my invention. The two forms shown in Figs. 2 and 3 are the most common forms of hinge elements used in coach front seats.

In the modified form of my invention shown in Fig. 4, the extension arm B employs a push spring 44, which is received in a slot 45 in the flat shank 46 of the arm B below the hinge pin 32. The opening 47, shown in Fig. 4, may be employed where it is desired to permanently lock the extension arm against hinging. Any of the usual forms of hinge connection may be employed at the upper end of the arm B shown in Fig. 4.

It will now be seen that by grasping the extension arms B and pulling the seat back upwardly, it may be swung rearwardly to a horizontal position such as shown in Fig. 1, in which position the extension arms B will be held rigidly by the shoulders 35 against movement downwardly from the horizontal. This is essential for otherwise the seat back would collapse under the weight of the sleeper, due to the open joint of the hinge between the back and the extension arms. With the extention arms locked rigidly in a horizontal position, they rigidly support the back at their ends.

The total height of the bracket, including the bracket proper A and the extension arm B, is made the same as the usual height of the brackets which they replace. Thus my invention may be installed by simply removing the old brackets and attaching the brackets of my invention, no alteration of the seat back hinge elements being necessary.

A further advantage in the present invention lies in the fact that the resilient elements will prevent the extension arms from jolting out of locked position under the influence of vertical vibration of the vehicle while in motion.

The lip 34 aids in returning the back to vertical position. By pulling up on the back, the ends of the extension arm are guided back into the posts.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a vehicle construction, a front seat including a cushion, a bracket attached thereto in substitution for the usual front seat hinge member, said bracket including an upwardly projecting tubular post, the rear wall portion of the post being cut away to form a pair of spaced ears at the sides of the post, a seat back including a frame member, an arm connecting the post and the frame member and hinged to the latter, means pivotally and slidingly connecting the arm to the side walls of the post, the lower end of the arm being adapted to be snugly received within the post when in a normal position, whereby to support the arm against lateral movement in any direction, the arm being adapted to move upwardly to a position where it may hinge around an axis intersecting the ears and the upper extremity of the rear wall of the post being positioned to engage the arm and support it against movement beyond a horizontal position.

2. In a vehicle construction, a front seat including a cushion, a bracket attached thereto in substitution for the usual front seat hinge member, said bracket including an upwardly projecting tubular post, the rear wall portion of the post being cut away to form a pair of spaced ears at the sides of the post, a seat back including a frame member, an arm connecting the post and the frame member and hinged to the latter, and a pin secured between the ears, the arm having one end adapted to be snugly received within the post when in a normal position whereby the arm will be braced against lateral movement in any direction when in that position, and being provided with a slot receiving said pin so as to allow upward movement of the arm from said normal position to a position where it may hinge around the pin, the upper extremity of the rear wall being positioned to engage the arm and to support it against movement beyond said horizontal position.

3. In a vehicle construction, a front seat including a cushion, a bracket attached thereto in substitution for the usual front seat hinge member, said bracket including an upwardly projecting tubular post, the rear wall portion of the post being cut away to form a pair of spaced ears at the sides of the post, a seat back including a frame member, an arm connecting the post and the frame member and hinged to the latter, and a pin secured between said ears, the arm having one end adapted to be snugly received within the post when in a normal position whereby the arm will be braced against lateral movement in any direction when in that position, the arm being provided with a slot receiving said pin so as to allow upward movement of the arm from said normal position to a position where it may hinge around the pin, the upper extremities of the forward and rear walls being positioned to engage the side of the arm when the latter is in a horizontal position.

4. In a vehicle construction, a front seat including a cushion, a bracket attached thereto in substitution for the usual front seat hinge member, said bracket including an upwardly projecting tubular post, the rear wall portion of the post being cut away to form a pair of spaced ears at the sides of the post, a seat back including a frame member, an arm connecting the post and the frame member and hinged to the latter, a pin secured between said ears, the arm having one end adapted to be snugly received within the post when in a normal position whereby the arm will be braced against lateral movement in any direction when in that position, the arm being provided with a slot receiving said pin so as to allow upward movement of the arm from said normal position to a position where it may hinge around the pin, and resilient means acting between the arm and the pin to urge the arm toward its said end.

Signed this 4 day of June, 1928, in the county of Woodbury and State of Iowa.

HERBERT R. GRAHAM.